Patented Mar. 8, 1932

1,848,506

UNITED STATES PATENT OFFICE

ALFRED THAUSS, OF COLOGNE-DEUTZ/RHINE, AND FRITZ BALLAUF, OF ELBERFELD, GERMANY, ASSIGNORS TO GENERAL ANILINE WORKS, INC., OF NEW YORK, N. Y., A CORPORATION OF DELAWARE

THIOPHENOL TANNING AND MORDANTING AGENTS

No Drawing. Application filed December 27, 1929, Serial No. 417,003, and in Germany July 5, 1929.

The present invention relates to improvements in the preparation of tanning and mordanting agents, and more particularly it relates to improvements in the process described in U. S. Patent No. 1,757,400.

In this U. S. Patent No. 1,757,400 there is described a process of preparing sulfurized compounds of phenols by heating a phenol with sulfur and a small, that means, a catalytically acting amount of a neutral salt of a weak acid, the molecular amount of the phenol used being smaller than that of the sulfur, the proportion being, for instance, 1:1.5, and the quantity of the neutral salt of the weak acid being less than 1%, calculated upon the weight of the phenol, for instance, 0.3 or 0.8%.

Now it has been found that the sulfurization is accelerated when using an excess of the phenolic compound in question. By this modification of the above described process, the further advantage is involved that the resulting tanning and mordanting agent is very pure and white. We prefer to use the phenolic compound in an excess of about 30 to 70%. The conditions of working are the same as described in the U. S. Patent No. 1,757,400. When the sulfurization is complete the excess of phenolic compound is removed, for instance by distillation. Best results are obtained by removing the excess of phenolic compound by distillation in vacuo.

The following example illustrates our invention without limiting it thereto:

*Example.*—280 parts by weight of phenol, 100 parts by weight by sulfur and 2 parts by weight of sodium nitrite are heated to a temperature of about 180–210° C. until the developing of the hydrogen sulfide, according to Example 1 of the U. S. Patent No. 1,757,400, has ceased. The excess of phenol is then distilled off in vacuo and the remainder is transformed by the addition of a sufficient quantity of alkali into the water-soluble salt.

We claim:
1. In the process for preparing sulfurized compounds of phenols the step which comprises heating to a temperature of 210° C. for several hours about 280 parts of phenol, 100 parts of sulfur and 2 parts of sodium nitrite.

2. In the process for preparing sulfurized compounds of phenols, the step which comprises heating to a temperature of 210° C. for several hours about 280 parts of phenol, 100 parts of sulfur and 2 parts of sodium nitrite and removing the excess of phenol by distillation in vacuo.

3. In the process of preparing sulfurized compounds of phenols by heating a phenolic compound with sulfur in the molecular ratio of 1 to about 1.5 with the addition of a small amount of a neutral salt of a weak acid, the modification which comprises performing the reaction with an additional amount of about 30 to 70% of the phenolic compound.

4. In the process of preparing sulfurized compounds of phenols by heating at a temperature of about 180–210° C. a phenolic compound with sulfur in the molecular ratio of 1 to about 1.5 with the addition of a small amount of a neutral salt of a weak acid, the modification which comprises performing the reaction with an additional amount of about 30 to 70% of the phenolic compound.

5. In the process of preparing sulfurized compounds of phenols by heating a phenolic compound with sulfur in the molecular ratio of 1 to about 1.5 with the addition of a small amount of a neutral salt of a weak acid until the evolution of hydrogen sulfide has ceased, the modification which comprises performing the reaction with an additional amount of the phenolic compound of about 30 to 70% and removing the excess of the phenolic compound.

6. In the process of preparing sulfurized compounds of phenols by heating at a temperature of about 180–210° C. a phenolic compound with sulfur in the molecular ratio of 1 to about 1.5 with the addition of a small amount of a neutral salt of a weak acid until the evolution of hydrogen sulfide has ceased, the modification which comprises performing the reaction with an additional amount of the phenolic compound of about 30 to 70% and removing the excess of the phenolic compound by distillation.

In testimony whereof, we affix our signatures.

ALFRED THAUSS.
FRITZ BALLAUF.